US006372066B1

(12) United States Patent
Bream

(10) Patent No.: US 6,372,066 B1
(45) Date of Patent: Apr. 16, 2002

(54) VIBRATION EXCITER

(75) Inventor: Charles Bream, Cambridgeshire (GB)

(73) Assignee: New Transducers Limited, London (GB)

( * ) Notice: Subject to any disclaimer, the term of this patent is extended or adjusted under 35 U.S.C. 154(b) by 0 days.

(21) Appl. No.: 09/565,377

(22) Filed: May 5, 2000

Related U.S. Application Data

(60) Provisional application No. 60/150,812, filed on Aug. 26, 1999.

(30) Foreign Application Priority Data

May 6, 1999 (GB) .............................................. 9910450
May 12, 1999 (GB) .............................................. 9911039

(51) Int. Cl.[7] ............................................... B32B 31/16
(52) U.S. Cl. ...................................... 156/73.1; 156/292
(58) Field of Search ............................... 156/73.1, 290, 156/292, 308.2, 308.6, 309.6, 580.1, 580.2

(56) References Cited

U.S. PATENT DOCUMENTS 4,029,911 A 6/1977 Albinger ............. 179/115.5 ES
4,071,111 A 1/1978 Croup ........................ 181/149
5,303,209 A 4/1994 Frasl .......................... 367/174
5,426,341 A * 6/1995 Bory et al. ................. 310/323
5,699,439 A 12/1997 Geisenberger et al. ...... 381/194
6,278,787 B1 * 8/2001 Azima ........................ 381/152

FOREIGN PATENT DOCUMENTS

| | | |
|---|---|---|
| DE | 41 42 455 | 6/1993 |
| DE | 195 29 848 | 1/1997 |
| EP | 0 614 327 | 9/1994 |
| WO | WO 97/09842 | 3/1997 |

OTHER PUBLICATIONS

Patent Abstracts of Japan, vol. 008, No. 281 (E–286), Dec. 21, 1984 & JP 59 149496 (Onkyo KK), Aug. 27, 1984.

* cited by examiner

*Primary Examiner*—James Sells
(74) *Attorney, Agent, or Firm*—Foley & Lardner

(57) ABSTRACT

A method of making a loudspeaker comprising attaching a vibration exciter to a bending-wave panel by bringing the vibration exciter and the panel into contact over an area, and applying ultrasound energy to the contact area.

12 Claims, 2 Drawing Sheets

VIBRATION EXCITER

This application claims the benefit of provisional application No. 60/150,812, filed Aug. 26, 1999.

TECHNICAL FIELD

The invention relates to vibration exciters, more particularly for use in applying bending wave energy to panel-form structures to form loudspeakers, such as, but not limited to, the kind described in WO97/09842 and counterpart U.S. application Ser. No. 08/707,012, U.S. Pat. No. 6,332,029 filed Sep. 3, 1996.

BACKGROUND ART

WO97/09859 teaches the direct connection of a voice coil of an electrodynamic vibration exciter to a bending-wave panel using adhesive means, and a range of adhesives may be used to achieve such bonding. Three frequently used types are; cyanoacrylates (so-called Super Glue), two-part epoxies and doubled-sided adhesive pads. These all exhibit limitations including:

1. in production, wet adhesives are difficult to apply, particularly to castellated exciters;
2. the fumes emitted by cyanoacrylates during cure are a health hazard, which require extraction systems in production;
3. blooming of cyanoacrylates promotes crystallisation of ferrofluids;
4. gap-filling adhesives, such as two-part epoxies, require relatively large bond-line thicknesses to achieve maximum bond strength;
5. double-sided adhesive pads add (often unwanted) compliance at the exciter-panel interface, and
6. the exciter needs to be grounded if a double-sided adhesive pad is used with a castellated exciter coupler in view of the limited bond strength due to small bond area.

It is an object of the invention to avoid or at least mitigate such problems.

SUMMARY OF THE INVENTION

From one aspect, the invention is a method of making a loudspeaker comprising attaching a vibration exciter to a bending-wave panel by bringing the vibration exciter and the panel into contact over an area, and applying ultrasound energy to the contact area.

The attachment may be by ultrasonic welding.

The vibration exciter may have a thermoplastic component, and the bending-wave panel may have a thermoplastic component, and the respective thermoplastic components may be welded together.

The vibration exciter may be electrodynamic and its thermoplastic component may be a mounting foot attached to a voice coil. The mounting foot may be formed with a mounting face having at least one sharp projection in which the ultrasonic energy is concentrated during welding.

The method may comprise engaging the foot and pressing the foot into contact with the panel during application of the ultrasound energy.

The bending-wave panel thermoplastic component may be a face skin on the panel.

From another aspect the method may comprise arranging a thermally responsive adhesive to be present at the contact area and between the panel and the exciter and applying ultrasound energy to the adhesive to actuate the adhesive to bond the exciter and panel together.

The adhesive may be applied to the contact area in the form of a film.

The ultrasound energy may be applied to a face of the panel opposite to that to which the vibration exciter is attached.

BRIEF DESCRIPTION OF THE DRAWINGS

Examples which embody the best mode for carrying out the invention are described in detail below and are diagrammatically illustrated in the accompanying drawings in which.

DETAILED DESCRIPTION

Figure 1:
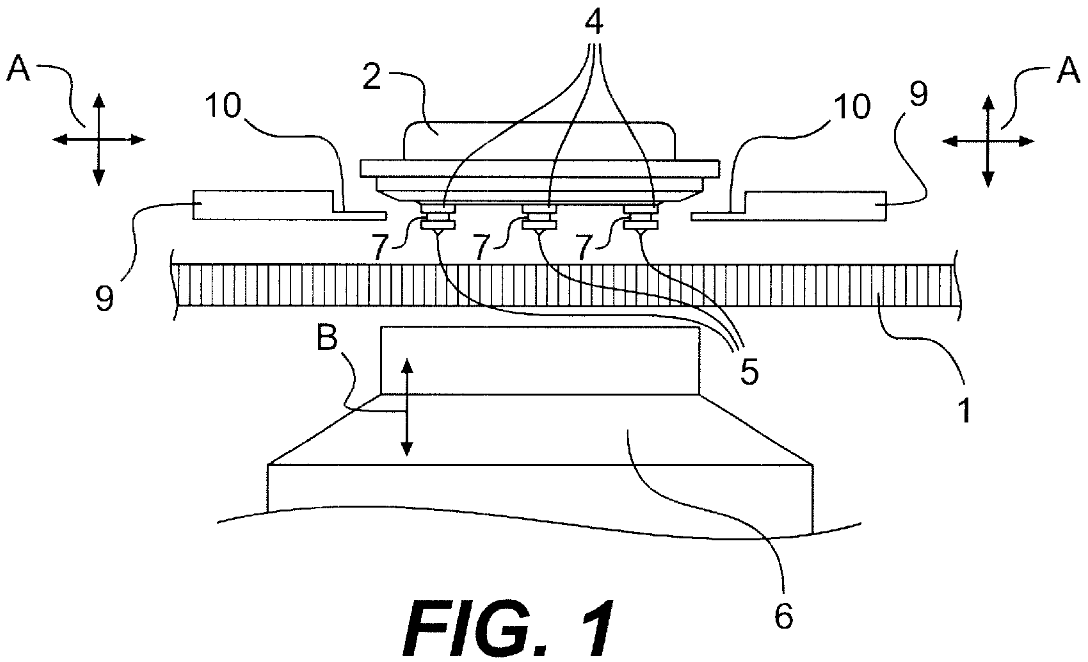
FIG. 1 is a schematic illustration of a welding process by which a vibration exciter is fixed to a bending wave panel.
Figure 2:
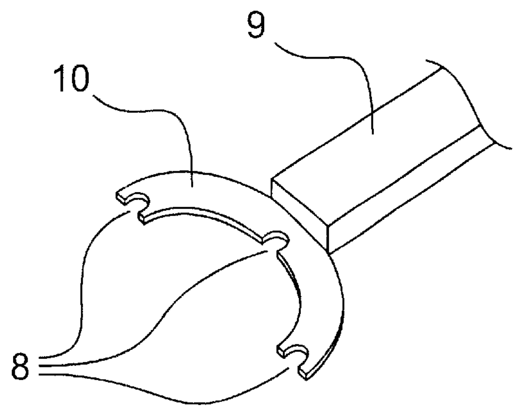
FIG. 2 is a partial perspective view of a clamping tool for applying the vibration exciter to the panel during welding.

In FIGS. 1 and 2 of the drawing there is shown a method of making a loudspeaker consisting of a bending wave panel 1 and an electrodynamic vibration exciter 2 having a voice coil assembly (not shown) having an array of thermoplastic mounting feet 4 by which the voice coil assembly is fixed to the panel 1. Each foot 4 is formed with a sharp point or projection 5 projecting downwardly towards the panel face so that welding energy, applied to the face of the panel opposite to that to which the exciter 2 is to be attached via the horn tip 6 of an ultrasonic welder (not shown), is concentrated in the area of the projections 5 during welding. The tip 6 is moveable toward and away from the under face of the panel as indicated by arrow B.

The basic principle of ultrasonic welding is to locally melt the two components to be bonded at the bond site. Mixing/fusion of the molten material, e.g. polymer, leads to the removal of the interface, resulting in a one-part component.

In this technique vibrational energy is applied remotely from the weld-line or positions and the energy is transferred through the component to the interface, where the resulting frictional energy is converted to heat in the energy director. Provided the power level and joint design are correct the material will be heated to above its melt temperature and the components will weld/fuse together, under moderate pressure. To achieve such moderate pressure, the feet 4 are formed with grooves 7 which can be engaged in the notches 8 in respective forked clamping members 9 which are movable as indicated by arrows A both towards and away from the panel 1 and laterally across the panel to locate the exciter accurately in position, after which the members 9 can clamp the exciter by its feet 4 to the panel to allow welding to take place. The members 9 can then be withdrawn laterally away from the exciter.

Alternatively, the whole exciter 2 may be pressed downwards to bring its mounting foot or feet into contact with the panel surface. In this case there is a risk of damaging the voice coil suspension and it will normally be necessary to provide voice coil limit stops (not shown) in the exciter to prevent excessive voice coil movement.

The main requirements for a successful weld are:

1. Both components (exciter coupler and panel faceskin) are made from the same or compatible thermoplastic material, e.g. plastics;

2. Suitable design and position of the energy directors, and

3. Supply of the correct amount of energy in terms of both frequency and power.

In view of requirement (1) above, where the panel skin is of a plastics material, it will normally be necessary for the part of the exciter to be mounted to the resonant panel to be of a similar plastics material. Since we would normally wish to fix the voice coil of an electrodynamic exciter to the panel and since the voice coil may be of metal, the end of the voice coil to be mounted on the panel is secured to a foot in the form of a moulded plastics ring, which may, if desired, be castellated.

Typical processing parameters are 1–2 kW supplied at 20 kHz or 35 kHz, producing tip amplitudes of 50–60 μm. Generally the higher frequencies are used for delicate components such as electrical switches. The power can be delivered to either the panel or directly to the exciter foot.

There is also the potential to use the exciter to deliver the ultrasonic welding energy. This is dependent on the exciter, whether piezo or electrodynamic, being able to supply high power pulses (500 W to 2 kW for 0.5–2 s).

The panel faceskin may be textured in the vicinity of the weld to improve the weld.

By way of example, 25 mm NEC (polycarbonate coupler) and 25 mm Peerless (glass reinforced polycarbonate coupler) exciters are compatible with "Trauma-Lite"™ panel materials (woven glass reinforced polycarbonate faceskins).

Figure 3:
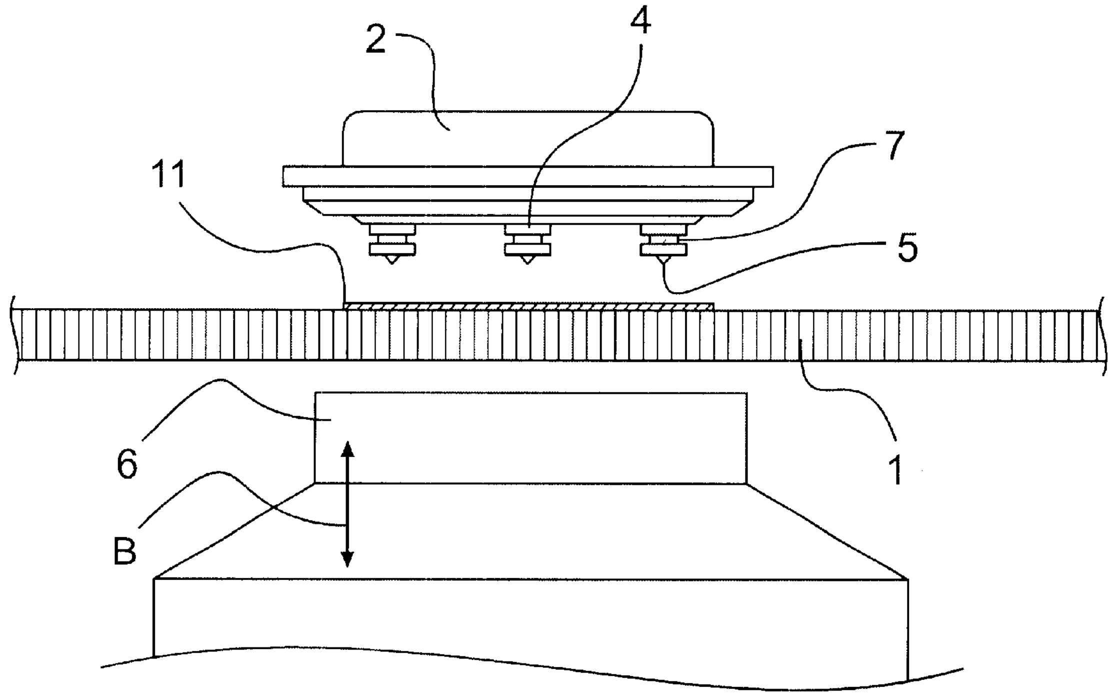
FIG. 3 is a schematic illustration generally similar to that of FIG. 1 of another embodiment.

FIG. 3 shows a method of making a loudspeaker by mounting an inertial vibration exciter 2 on a bending wave panel 1 using ultrasonic energy which is generally similar to that of FIGS. 1 and 2, but in this case the joining method involves activating a thermally responsive film 11 of adhesive, which may be thermosetting or thermoplastic. Thus the feet 4 are pressed against the panel, or rather against the adhesive film 11 on the panel, e.g. by a clamping tool 9, and ultrasonic energy is applied to the panel via the horn tip 6 to activate the adhesive to join the components 1 and 2 together.

Ultrasonic welding or bonding of exciters to panels overcomes many of the problems associated with conventional adhesive mountings, including:

1. Effective removal of the panel-exciter interface—giving high 'bond' strength;

2. Little or no added mass or compliance at the exciter-panel interface;

3. Straightforward and rapid process, suitable for production lines;

4. Removes the health and safety issues associated with the use of wet adhesives, and 5. Does not crystallise ferrofluid.

The invention thus provides a novel and useful method of making bending-wave panel loudspeakers.

What is claimed is:

1. A method of making a loudspeaker comprising the steps of attaching a vibration exciter to a bending-wave panel by bringing the vibration exciter and the panel into contact over an area, and applying ultrasound energy to the contact area.

2. A method according to claim 1, wherein the attachment is by ultrasonic welding.

3. A method according to claim 2, wherein the vibration exciter has a thermoplastic component, the bending-wave panel has a thermoplastic component, and the respective thermoplastic components are welded together.

4. A method according to claim 3, wherein the vibration exciter is electrodynamic and has a voice coil, and wherein the thermoplastic component of the exciter is a mounting foot attached to the voice coil.

5. A method according to claim 4, wherein the mounting foot is formed with a mounting face having at least one sharp projection in which the ultrasonic energy is concentrated during welding.

6. A method according to claim 5, comprising engaging the at least one foot and pressing the at least one foot into contact with the panel during application of the ultrasound energy.

7. A method according to claim 6, wherein the bending-wave panel thermoplastic component is a face skin on the panel.

8. A method according to claim 7, wherein the face skin is textured at the weld position(s).

9. A method according to claim 1, further comprising arranging a thermally responsive adhesive to be present at the contact area and between the panel and the exciter, and wherein the ultrasound energy is applied to the adhesive to activate the adhesive to bond the exciter and the panel together.

10. A method according to claim 9, wherein the adhesive is applied to the contact area in the form of a film.

11. A method according to claim 10, wherein the ultrasound energy is applied to a face of the panel opposite to that to which the vibration exciter is attached.

12. A method according to claim 1, wherein the ultrasound energy is applied to a face of the panel opposite to that to which the vibration exciter is attached.

* * * * *